No. 725,786. PATENTED APR. 21, 1903.
W. SMETHURST.
PROCESS OF TREATING SUBSTANCES WITH NASCENT CARBON DIOXID.
APPLICATION FILED MAR. 10, 1902.
NO MODEL.
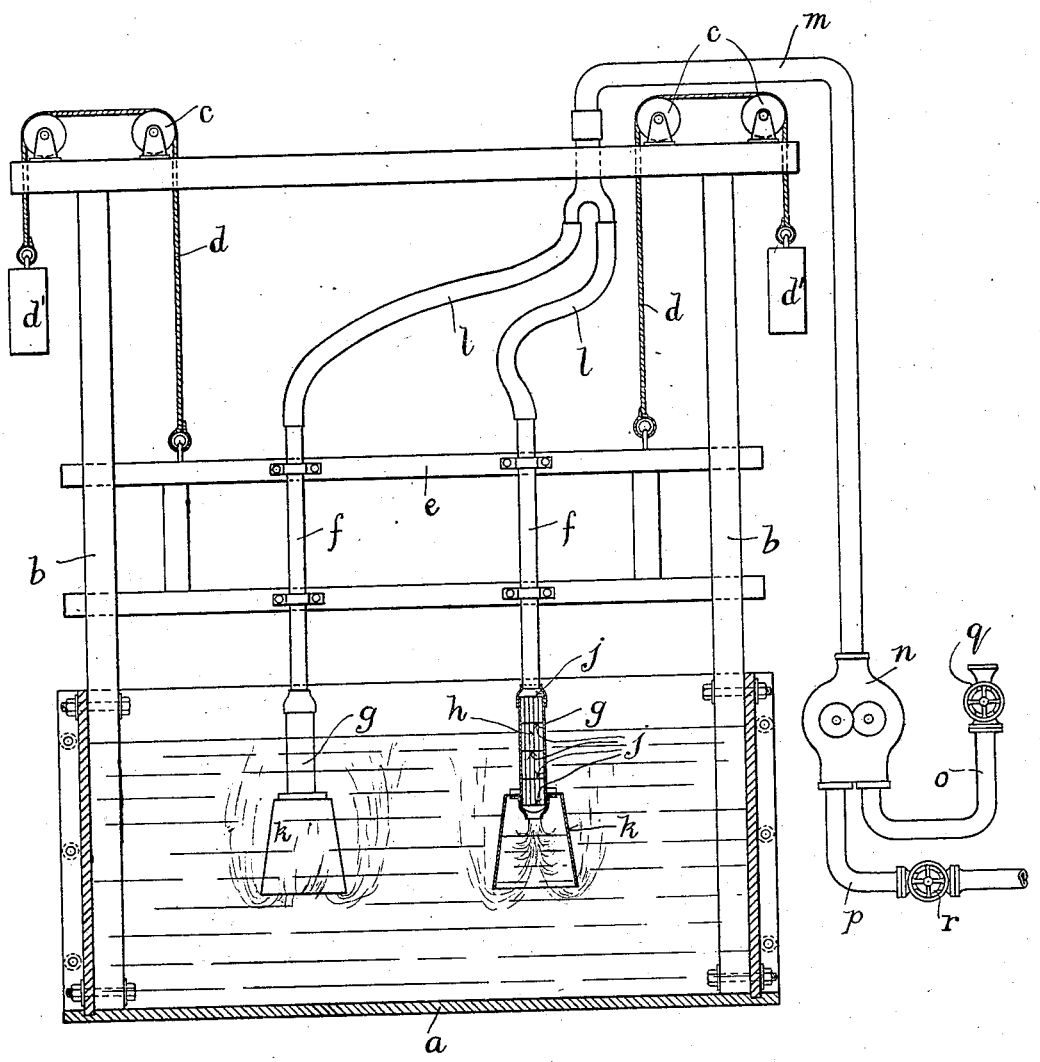
WITNESSES:
Isabella Waldron
Adelaide Claire Gleason.
INVENTOR.
William Smethurst
BY Richards & Co
ATTORNEY

UNITED STATES PATENT OFFICE.

WILLIAM SMETHURST, OF DOLGELLY, ENGLAND.

PROCESS OF TREATING SUBSTANCES WITH NASCENT CARBON DIOXID.

SPECIFICATION forming part of Letters Patent No. 725,786, dated April 21, 1903.

Application filed March 10, 1902. Serial No. 97,583. (No specimens.)

*To all whom it may concern:*

Be it known that I, WILLIAM SMETHURST, residing at Dolgelly, England, have invented a new and useful Improvement in the Treatment of Substances with Nascent Carbon Dioxid to Produce a Chemical Reaction, (for which I have made application for Letters Patent in Great Britain, No. 16,506, bearing date August 16, 1901,) of which the following is a specification.

This invention relates to the treatment of substances with nascent carbon dioxid to produce a chemical reaction and is particularly applicable for the production of borax and boracic acid.

The object of my invention is the production of a chemical reaction by means of nascent carbon dioxid in a simple, effective, and cheap manner.

To carry my invention into effect, I use a combustible gaseous mixture—such, for example, as inflammable gas and air intimately mixed in such proportions as to produce perfect combustion—and I burn this mixture beneath the surface of a liquid containing in solution or mechanically suspended therein the particular substance that it is desired to be acted upon by the nascent carbon dioxid emitted by the burner during the combustion of the gas, so that the carbon dioxid in its nascent condition comes into intimate contact with the material under treatment. The result of this contact with nascent carbon dioxid produces precipitated carbonates and liberates the acid previously in conjunction with the base of the substance treated.

For example, in the case of the manufacture of borax calcium borate held in suspension in water contained in a suitable tank is the material acted on, and on the evolution of nascent carbon dioxid from the combustion of the gas beneath the surface of the liquid the resultant reaction is the decomposition of the borate and the production of boracic acid and calcium carbonate. The calcium carbonates are insoluble, and the boracic acid may be then decanted, which must be done quickly while warm to prevent secondary reaction. It may then be crystallized. The addition of the proper quantity of sodium oxid in any commercial form to the boracic acid will produce sodium borate or borax, or the boracic acid is salable as a marketable product or may be used in any convenient way for the production of borax.

In order that the invention may be the better understood, I will now proceed to describe a form of apparatus for carrying out the process in relation to the accompanying drawing, reference being had to the letters marked thereon.

The drawing shows the apparatus in plain and part sectional elevation.

Upon the tank $a$, containing the water carrying the material in suspension, is mounted a supporting-frame $b$, having pulleys $c$, over which ropes $d$ are passed. At one end of each of the ropes a counterbalance-weight $d'$ is hung, while the other end is attached to a movable frame $e$, adapted to slide vertically upon or within the supporting-frame $b$. The frame $e$ carries the pipes $f$, at the lower part of which are arranged the burners $g$, which are composed of a series of groups of small tubes $h$, interspersed with disks of wire-gauze $j$, so as to prevent the gas lighting back in the tubes or pipes $f$. At the mouth of each burner $g$ a bell $k$ is arranged, within which the combustion takes place. The upper end of the pipes $f$ are connected by flexible pipes $l$, attached to the pipe $m$, leading from a gas-forcing appliance, such as a Root's blower $n$, on the suction of which is an air-inlet pipe $o$, with adjusting-valve $q$ and a gas-pipe $p$ and an adjusting-valve $r$, connected to the source of combustible gas. When the gas-forcing appliance $n$ has been started, the gas is lighted at the burners, and when the proportion of gas and air has been regulated by adjusting the valves $q$ and $r$ relatively to one another the burners are lowered into the tank containing the water holding the material to be acted upon, and the process is then in operation.

Having now described my invention, what I claim, and desire to secure by Letters Patent, is—

In a process for the treatment of substances with nascent carbon dioxid, mixing a carbonaceous combustible gas with its chemical equivalent of air for perfect combustion and burning said mixture under pressure in a solution containing the calcium borate to be treated and recovering the boracic acid by decanting while the solution is warm, substantially as described.

In witness whereof I have hereunto set my hand in presence of two witnesses.

WILLIAM SMETHURST.

Witnesses:
RICHARD A. HOFFMANN,
CHARLES CARTER.